United States Patent
Endo et al.

(10) Patent No.: US 8,553,325 B2
(45) Date of Patent: Oct. 8, 2013

(54) TRANSMISSION TYPE SCREEN, IMAGE DISPLAY METHOD FOR TRANSMISSION TYPE SCREEN, AND PROJECTION DISPLAY APPARATUS

(75) Inventors: Takao Endo, Tokyo (JP); Yuzo Nakano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 472 days.

(21) Appl. No.: 12/908,267

(22) Filed: Oct. 20, 2010

(65) Prior Publication Data

US 2011/0261327 A1 Oct. 27, 2011

(30) Foreign Application Priority Data

Apr. 26, 2010 (JP) ................................. 2010-101246

(51) Int. Cl.
*G03B 21/56* (2006.01)
(52) U.S. Cl.
USPC ......................................... 359/460; 359/449
(58) Field of Classification Search
USPC ........................... 359/453, 457, 460, 443, 449
See application file for complete search history.

(56) References Cited

U.S. PATENT DOCUMENTS

| | | | |
|---|---|---|---|
| 6,239,907 B1 * | 5/2001 | Allen et al. ................... | 359/443 |
| 7,242,536 B2 | 7/2007 | Suzuki et al. | |
| 7,408,707 B2 * | 8/2008 | Yeo et al. ...................... | 359/452 |
| 7,746,570 B2 | 6/2010 | Suzuki et al. | |
| 2006/0056021 A1 * | 3/2006 | Yeo et al. ...................... | 359/460 |
| 2006/0066945 A1 * | 3/2006 | Yeo et al. ...................... | 359/457 |
| 2008/0013171 A1 * | 1/2008 | Kumagai et al. ............... | 359/457 |
| 2010/0134883 A1 | 6/2010 | Endo et al. | |
| 2010/0188745 A1 | 7/2010 | Endo et al. | |
| 2010/0290114 A1 | 11/2010 | Endo et al. | |

FOREIGN PATENT DOCUMENTS

| | | |
|---|---|---|
| JP | 2005-300711 | 10/2005 |
| JP | 2008-165058 | 7/2008 |

OTHER PUBLICATIONS

U.S. Appl. No. 12/359,652, filed Jan. 26, 2009, Endo, et al.

* cited by examiner

*Primary Examiner* — Christopher Mahoney
(74) *Attorney, Agent, or Firm* — Oblon, Spivak, McClelland, Maier & Neustadt, L.L.P.

(57) ABSTRACT

The transmission type screen includes: a Fresnel lens screen (20); and an image display element (30), in which the Fresnel lens screen includes: a Fresnel optical element (21) including a prism formed on an incident surface side as seen from the emitter; and a first light diffusion unit (22) for diffusing an image light passing through the Fresnel optical element, and the image display element includes: a lens element (40) for spatially dividing the image light from the Fresnel lens screen and changing a direction of the image light; a birefringent layer (90) provided at a subsequent stage of the lens element, for mixing image light obtained by spatial division; and a second light diffusion unit (60) provided at a subsequent stage of the birefringent layer, for diffusing the image light passing through the birefringent layer.

6 Claims, 7 Drawing Sheets

TRANSMISSION TYPE SCREEN, IMAGE DISPLAY METHOD FOR TRANSMISSION TYPE SCREEN, AND PROJECTION DISPLAY APPARATUS

BACKGROUND OF THE INVENTION

1. Field of the Invention

The present invention relates to a transmission type screen, to which image light is projected from a rear side of the screen as seen from a viewer, to thereby display an image, and more particularly, to a transmission type screen in which image degradation caused by speckles is reduced, an image display method for the transmission type screen, and a projection display apparatus including the transmission type screen.

2. Description of the Related Art

A projection display apparatus is an apparatus for displaying an image using a combination of a Fresnel lens screen and a diffusion sheet (diffusion layer). Unlike a cathode ray tube (CRT) display and a plasma display panel (PDP), the projection display apparatus is a non-self-luminous display apparatus.

The projection display apparatus includes: an illumination optical system serving as a projector, for guiding light from a light source in a predetermined direction; a light valve illuminated with the light guided by the illumination optical system, for adjusting the amount of light based on an image signal to form an image; and a projection optical system for enlarging and projecting the image formed by the light valve to a screen.

The projection display apparatuses are broadly categorized into a rear projection type display apparatus for projecting image light to a screen from a rear side of the screen as seen from a viewer and a front projection type display apparatus for projecting image light to the screen from a front side of the screen as seen from the viewer. A transmission type screen used for the rear projection type display apparatus of the former type includes: a Fresnel lens screen for bending image light from a projector to a viewer side; and an image display element for forming an image of the image light from the Fresnel lens screen and expanding the light beam at a set dispersion angle.

A Fresnel lens is generally formed to have a lens period smaller than a projection pixel size (for example, 1/10 of pixel size), and thus has a very small size even in the thickness direction (thickness including prism portion thickness is, for example, several hundred μm). Therefore, in order to hold the Fresnel lens, a base having a thickness range of approximately 1 mm to 5 mm is required.

In many cases, the base is made of a resin such as polymethyl methacrylate (PMMA), methyl methacrylate-styrene (MS), methyl methacrylate-butadiene-styrene (MBS), or polycarbonate (PC), or a glass.

In many cases, the Fresnel lens is made of, for example, a light curable resin and directly formed on a base. An element including the Fresnel lens and the base is called a Fresnel lens screen.

An image display element includes at least light diffusion means and a base. The light diffusion means uses surface unevenness larger than a wavelength of light (visible light range of 380 nm to 780 nm) or a refractive index difference between a diffusion layer base material and a fine particle larger than the wavelength of light.

A case in which a structure having a fluctuation larger than the wavelength of light is illuminated with light which is enlarged by the projection optical system to obtain large spatial coherence is considered. In this case, even when the light source is a lamp light source having small temporal coherence, a large number of bright and dark spots (glare) are randomly recognized. The bright and dark spots are generally called speckles (technically, subjective speckles) or scintillation, which causes image degradation.

As measures against such speckles (or scintillation), a technology of providing orthogonal polarization for each region using a diffusion member and a retardation plate having different optical axis directions for different regions has been proposed (see, for example, Japanese Patent Application Laid-open No. 2008-165058).

However, a conventional technology has the following problems.

In the conventional technology as disclosed in Japanese Patent Application Laid-open No. 2008-165058, the retardation plate having different optical axis directions for different regions is required to be located immediately in front of the screen. Therefore, a large patterned retardation plate equal in size to the screen is necessary, and hence there is a problem that manufacturing is difficult and a cost is high.

Further, the different regions are periodically provided, and hence there is also a problem that it is likely to generate moire fringes with a projection pixel, a Fresnel lens, or another micro-lens.

SUMMARY OF THE INVENTION

The present invention has been made to solve the problems as described above. An object of the present invention is to provide a transmission type screen which is easily manufactured at a low cost and displays an image with high resolution while image degradation caused by speckles is reduced, an image display method for the transmission type screen, and a projection display apparatus including the transmission type screen.

A transmission type screen according to the present invention is used for a rear projection type display apparatus for projecting image light from a rear surface thereof as seen from a viewer, and includes: a Fresnel lens screen for bending the image light from an emitter toward the viewer; and an image display element for imaging the image light from the Fresnel lens screen and expanding the image light at a dispersion angle, in which the Fresnel lens screen includes: a Fresnel optical element including a prism formed on an incident surface side as seen from the emitter; and first light diffusion means for diffusing the image light passing through the Fresnel optical element, and the image display element includes: a lens element for spatially dividing the image light from the Fresnel lens screen and changing a direction of the image light; a birefringent layer provided at a subsequent stage of the lens element, for mixing image light obtained by spatial division by the lens element; and second light diffusion means provided at a subsequent stage of the birefringent layer, for diffusing the image light passing through the birefringent layer.

A projection display apparatus according to the present invention includes: the transmission type screen; and an emitter for emitting image light to the transmission type screen.

An image display method for a transmission type screen according to the present invention is used for a rear projection type display apparatus for projecting image light from a rear surface thereof as seen from a viewer, the transmission type screen including: a Fresnel lens screen for bending the image light from an emitter toward the viewer; and an image display element for imaging the image light from the Fresnel lens screen and expanding the image light at a dispersion angle, the image display method including: a first diffusion step of diffusing, by the Fresnel lens screen, the image light passing through a Fresnel optical element; a spatially dividing step of spatially dividing, by the image display element, the image light from the Fresnel lens screen and changing a direction of the image light; a birefringent step of mixing image light obtained by spatial division in the spatially dividing step through birefringence; and a second diffusion step of diffusing the image light after the birefringent step.

According to the transmission type screen, the image display method for the transmission type screen, and the projection display apparatus according to the present invention, in the image display element of the transmission type screen including the Fresnel lens screen and the image display element, the birefringent layer for mixing the image light obtained by spatial division by the lens element is further provided between the lens element and the light diffusion means. Therefore, a transmission type screen which is easily manufactured at a low cost and displays an image with high resolution while image degradation caused by speckles is reduced, an image display method for the transmission type screen, and a projection display apparatus including the transmission type screen may be obtained.

DESCRIPTION OF THE PREFERRED EMBODIMENTS

Hereinafter, a transmission type screen, an image display method for the transmission type screen, and a projection display apparatus including the transmission type screen, according to preferred embodiments of the present invention, are described with reference to the attached drawings.

First Embodiment

Figure 1:
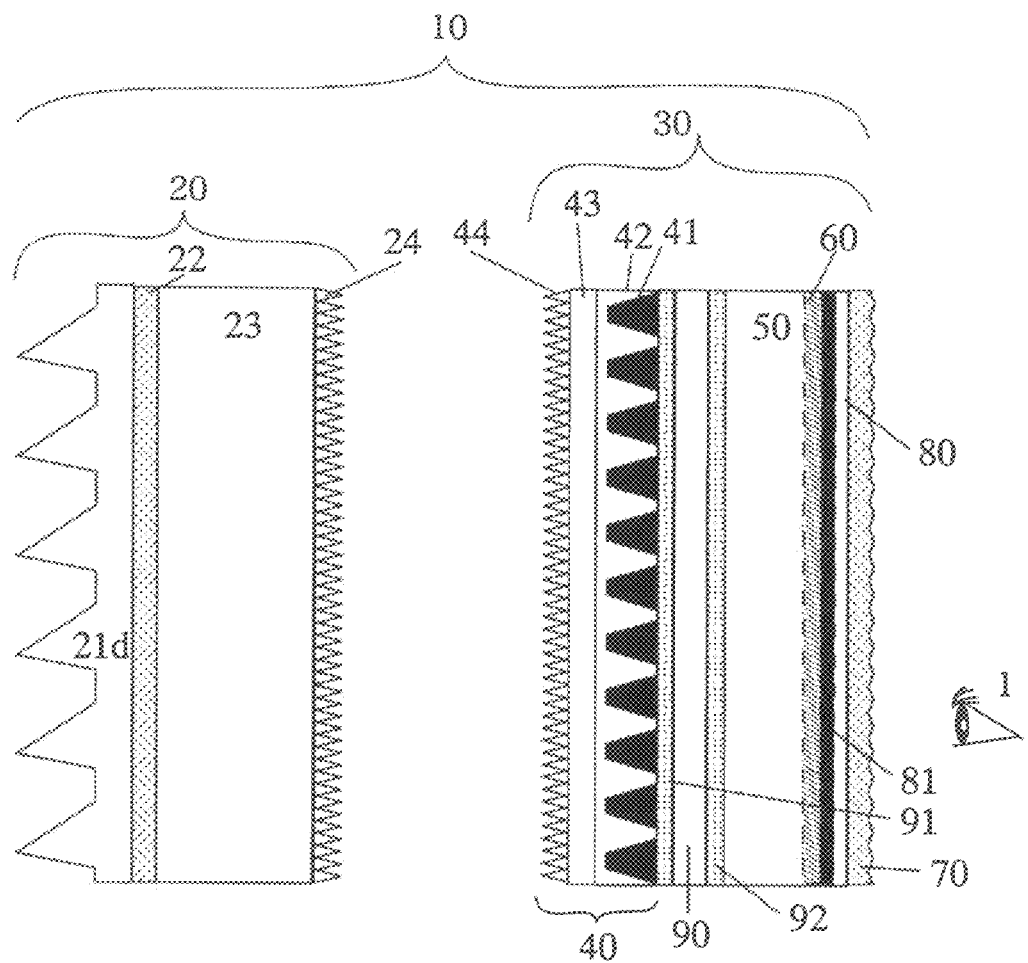
FIG. 1 is a structural view illustrating a transmission type screen according to a first embodiment of the present invention.

FIG. 1 is a structural view illustrating a transmission type screen according to a first embodiment of the present invention. As illustrated in FIG. 1, a transmission type screen 10 according to the first embodiment includes a Fresnel lens screen 20 and an image display element 30. The Fresnel lens screen 20 bends image light (not shown) to a viewer 1 side, and then the image light reaches the image display element 30. The image display element 30 forms an image of the image light from the Fresnel lens screen 20 and expands the image light at a set dispersion angle.

Figure 2:
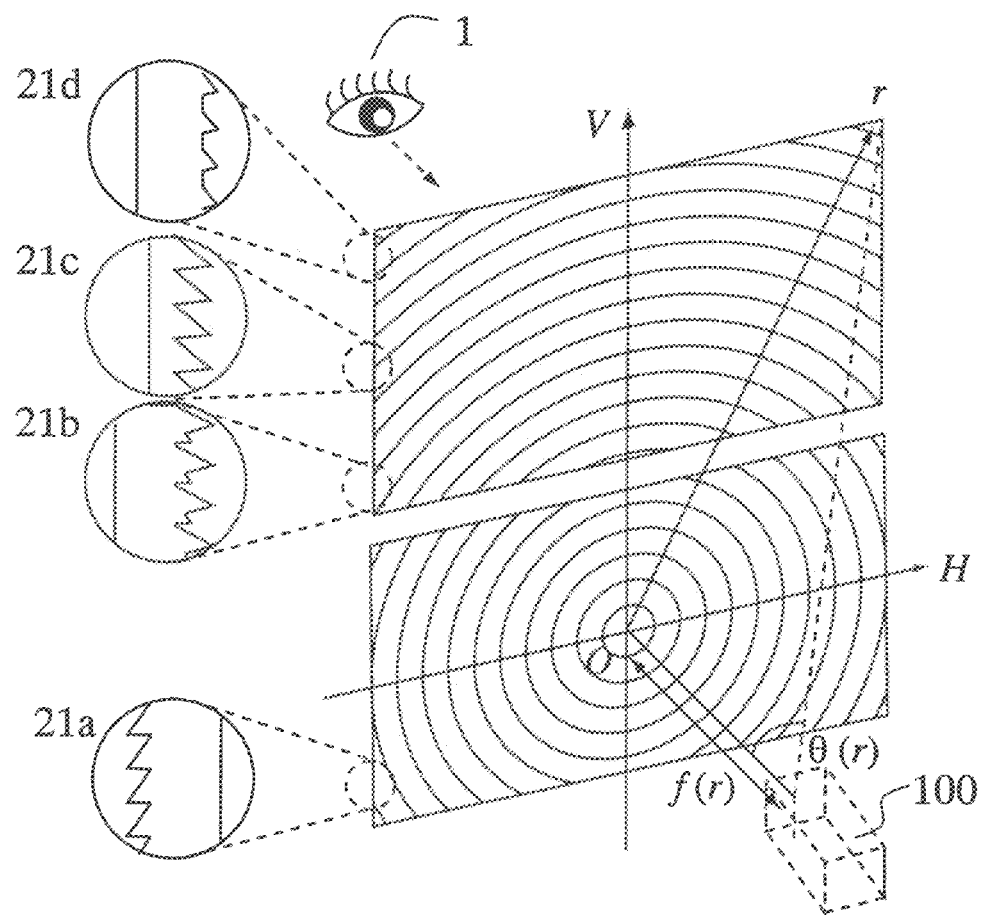
FIG. 2 is a diagram illustrating a specific structure of a Fresnel lens screen according to the first embodiment of the present invention.

The transmission type screen 10 has a structure in which, for example, a light source and a projection optical system are provided on a rear side thereof in a case where the screen is viewed from the viewer 1. FIG. 2 is a diagram illustrating a specific structure of the Fresnel lens screen 20 according to the first embodiment of the present invention. The Fresnel lens screen 20 has a function of bending image light from a projector (emitter) 100 including a light source, an illumination optical system, a light valve, and a projection optical system (each not shown) toward the viewer 1. Various Fresnel optical elements (Fresnel lenses) 21a, 21b, 21c, and 21d as illustrated in FIG. 2 are used for the Fresnel lens screen 20.

Specific examples of the Fresnel optical elements include the exit surface refraction type Fresnel lens 21a, the combined Fresnel lens 21b, the incident-surface side total-reflection type Fresnel lens 21c, and the incident-surface partial total-reflection type Fresnel lens 21d. The Fresnel lens 21a is generally and commonly used and has a lens formed on the viewer side (exit surface side). The Fresnel lenses 21b, 21c, and 21d each have a lens formed on a light source side (incident surface side) opposed to the viewer.

Hereinafter, a case where the incident-surface partial total-reflection type Fresnel lens 21d is applied as the best lens is described. However, the incident-surface side total-reflection type Fresnel lens 21c may be applied (details are described later). The combined Fresnel lens 21b and the exit surface refraction type Fresnel lens 21a are inferior to the incident-surface partial total-reflection type Fresnel lens 21d and the incident-surface side total-reflection type Fresnel lens 21c, but may be applied as a second best lens.

Next, the structures of the Fresnel lens screen 20 and the image display element 30 are described in detail with reference back to FIG. 1. The Fresnel lens screen 20 includes the incident-surface partial total-reflection type Fresnel lens 21d, a first light diffusion portion 22, a first base 23, and a first auxiliary lens 24.

The first light diffusion portion 22 has a function of diffusing light passing through the incident-surface partial total-reflection type Fresnel lens 21d and bonding the incident-surface partial total-reflection type Fresnel lens 21d to the first base 23. The first auxiliary lens 24 is provided to divide a wave front of the light into fine parts. The divided light reaches the subsequent image display element 30.

The image display element 30 includes at least a lens element 40, a second base 50, and a second light diffusion portion (second light diffusion means) 60. The lens element 40 is supported by the second base 50 and has a function of expanding the image light at the set dispersion angle. The second light diffusion portion 60 has a function of forming an image of the image light expanded by the lens element 40.

In general, the image display element 30 is directly viewed by the viewer 1, and hence, in the first embodiment, a surface treatment portion 70 is provided on a side closest to the viewer 1. The surface treatment portion 70 may be, for example, an antireflection layer for suppressing the reflection of light to reduce the influence of ambient light, an antiglare layer for suppressing apparent glare, an antistatic layer for preventing dust from being deposited by static electricity, or a hard coat layer for surface protection.

The surface treatment portion 70 may be directly formed in an outermost surface of the second base 50 on the viewer side. However, in the structure illustrated in FIG. 1 according to the first embodiment, the surface treatment portion 70 is formed on a third base 80 which is thin, and the third base 80 is bonded to the second base 50 through a first bonding layer 81.

In this case, the first bonding layer 81 may contain a pigment or a dye which absorbs ambient light. Further, the third base 80 which is thin is made of a film-shaped resin material such as polyethylene terephthalate (PET) or triacetyl cellulose (TAC).

In the second base 50, the base is made of a resin such as polymethyl methacrylate (PMMA), methyl methacrylate-styrene (MS), methyl methacrylate-butadiene-styrene (MBS), or polycarbonate (PC).

When the second base 50 is formed, the second light diffusion portion 60 is kneaded thereinto and layered. Therefore, the second base 50 and the second light diffusion portion 60 are integrally formed. In this case, the second light diffusion portion 60 is located on a side closer to the viewer with respect to at least the middle of the second base 50 in thickness. When the second base 50 is made of glass, the film-shaped second light diffusion portion 60 may be bonded to a side of the second base 50 which is closer to the viewer through a bonding layer.

Figure 3:
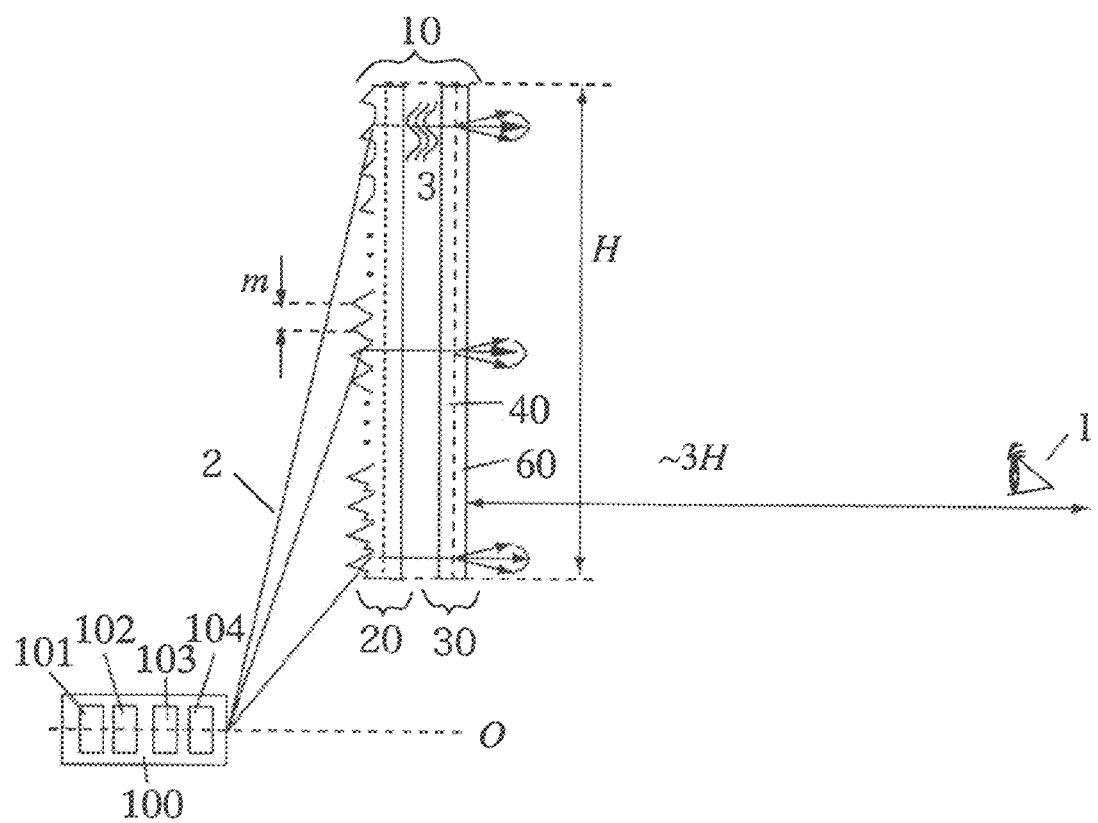
FIG. 3 is a schematic diagram illustrating a relationship between a screen and a projection pixel according to the first embodiment of the present invention.

FIG. 3 is a schematic diagram illustrating a relationship between the screen and a projection pixel according to the first embodiment of the present invention. As illustrated in FIG. 3, the transmission type screen 10 and the projector 100 serve as the projection display apparatus. The projector 100 includes a light source 101, an illumination optical system 102, a light valve 103, and a projection optical system 104. The projector 100 projects image light 2 to the transmission type screen 10.

When a height of the screen is denoted by H, a standard view distance is three times larger than the height H. For example, when a visual acuity of the viewer 1 is assumed to be 1.0 and the height H is set to 1.0 m, a resolution of the viewer 1 is approximately 1 mm. A projection pixel size of 1 mm is $\frac{1}{1,000}$ times the height of the screen which is 1 m. The number of effective scan lines of a so-called high definition television (HDTV) which is 1,080 is also based on this example.

According to the first embodiment, the height of the screen is assumed to satisfy "0.8 m<H<1.1 m", and hence the pixel size is assumed to satisfy "0.7 mm<(pixel size)<1.0 mm". In FIG. 3, a Fresnel prism period "m" is a period of a plurality of Fresnel prisms arranged in a saw-tooth pattern. A wave front 3 is a wave front of the image light 2 exiting from the Fresnel lens screen 20.

Next, a detailed structure of the lens element 40 is described with reference back to FIG. 1. The lens element 40 includes at least a trapezoidal lens 41, a light absorption portion 42, and a fourth base 43. The trapezoidal lens 41 has a function of distributing light from the light source over a solid angle. The light absorption portion 42 has a function of absorbing ambient light. The trapezoidal lens 41 and the light absorption portion 42 are supported by the fourth base 43.

A second auxiliary lens 44 for supporting light distribution control of the trapezoidal lens 41 may be provided on an incident-surface side outermost surface.

In the creation of FIG. 1, the second auxiliary lens 44 and the trapezoidal lens 41 are arranged along the longitudinal direction of the sheet, but actually arranged along the depth direction of the sheet. In other words, in an actual structure, the second auxiliary lens 44 and the trapezoidal lens 41 are arranged along the direction from the front of FIG. 1 to the back thereof. In this case, the second auxiliary lens 44 is opposed and orthogonal to the first auxiliary lens 24 provided in the Fresnel lens screen 20 (first auxiliary lens 24 is provided in longitudinal direction of sheet and second auxiliary lens 44 is provided in depth direction of sheet).

In FIG. 1 according to the first embodiment, a birefringent layer 90 is provided between the lens element 40 and the second base 50. The lens element 40 is bonded to the birefringent layer 90 through a second bonding layer 91. The second base 50 is bonded to the birefringent layer 90 through a third bonding layer 92.

Hereinafter, a case where the lens element 40 including the trapezoidal lens 41, the light absorption portion 42, the fourth base 43, and the second auxiliary lens 44 is applied as the best element is described. However, a lens element 40a described in a second embodiment of the present invention as described later may be applied.

According to the transmission type screen 10 having the structure as illustrated in FIG. 1, an effect may be obtained in which an image may be displayed at a high color temperature and a high resolution while image degradation caused by speckles is reduced. Hereinafter, the effect is described in detail.

Firstly, the coherence of a light wave is briefly described. The light wave with coherence generally has a predetermined relationship in phase and amplitude. When one (mode) of an initial phase, a frequency (spectrum), and a wave number (indicating direction because of vector) is in a similar state, the coherence (complex degree of coherence) is high. In contrast, when the mode is in a random state, the coherence (complex degree of coherence) is low.

In other words, when light is in phase, when light has the same frequency, or when light is oriented in a single direction, the complex degree of coherence is high. For example, laser light is in initial phase, has a narrowed frequency range (the same frequency), and has small expansion (oriented in single direction), and hence the complex degree of coherence is high. In contrast, white light is random in initial phase, has a wide frequency range (for example, black body radiation spectrum), and has large expansion, and hence the complex degree of coherence is low. Therefore, the white light is incoherent light.

Hereinafter, light oriented in the single direction, that is, polarized light is considered. Light is an electromagnetic wave and has two-directional components orthogonal to each other. In view of quantum mechanics, light has two degrees of freedom of spin. The complex degree of coherence is high in the same state and low in the different state. Therefore, when light has different polarization directions (different spin states), the complex degree of coherence is low. When light has the single polarization direction (the same spin state), the complex degree of coherence is high.

In view of energy, when energy falls into the ground state to cause degeneration, the complex degree of coherence is high. When degeneration is released, the complex degree of coherence is low. Therefore, in order to reduce the coherence, the single polarization direction is desirably changed into various directions for mixing.

In contrast, a retardation plate having different optical axis directions for different regions is used in the conventional technology. One polarization direction is set for a region, and another polarization direction orthogonal to the one polarization direction is set for an adjacent region. However, for example, when only the polarization direction is changed from the linear polarization direction to the circular polarization direction or when only the polarization direction is rotated, a state type changes but the number of types does not increase. Therefore, the coherence does not reduce.

In contrast, according to the first embodiment, for coherence reduction measures, the lens element 40 is located in front of the birefringent layer 90. When the lens element 40 acts, the wave front of light reaching the birefringent layer 90 may be finely and spatially divided at the period of the trapezoidal lens 41 and the light direction may be changed. As a result, a phase state of light passing the birefringent layer 90 may be changed while the light is spatially divided. After that, the phase is changed by a diffusion layer to mix light having changed polarization directions (that is, to mix light having different states). Therefore, the coherence reduces.

In other words, light passes through the birefringent layer 90, and then spatially expands while passing through the second base 50 to spatially mix polarization states, to thereby reduce the coherence. Then, the second light diffusion means 60 is illuminated. As a result, the second light diffusion means 60 is illuminated with the light having the reduced coherence, and hence glare reduces. Unlike a conventional case, a thick diffusion layer is not used, and hence image display may be performed in which wavelength dependence due to diffusion is small (color temperature is high) and resolution is high.

The second auxiliary lens 44 is provided in front of the trapezoidal lens 41 on the light source side as seen from the viewer, and hence the wave front may be finely and spatially divided before the trapezoidal lens 41. As a result, the effect described above may be further improved.

The birefringent layer 90 may be a wavelength plate having a single birefringent optical axis direction, for example, a ¼-wavelength plate, or a thin resin sheet formed by simple extrusion molding.

In the case of extrusion molding, a resin is crushed by a roll and thinned by stretching. When the molecular arrangement of the resin (polymer) is not spatially symmetrical, it is more likely to align a direction by stress. The phase of light is shifted by the aligned direction to change the polarization direction.

The thin resin sheet formed by simple extrusion molding has random optical axis directions in plane depending on residual stresses. In other words, without particularly using a wavelength plate designed to provide a specific retardation but using the thin resin sheet (containing residual stresses because of extrusion molding), the coherence may be reduced.

In the same resin sheet, a TAC film is not formed by extrusion molding, and hence there is not the effect described above.

According to the first embodiment, the incident-surface partial total-reflection type Fresnel lens 21d having the lens formed on the light source side (incident surface side) opposed to the viewer 1 is employed. Hereinafter, the reduction in coherence in a case where the incident-surface partial total-reflection type Fresnel lens 21d is used is described.

Figure 4:
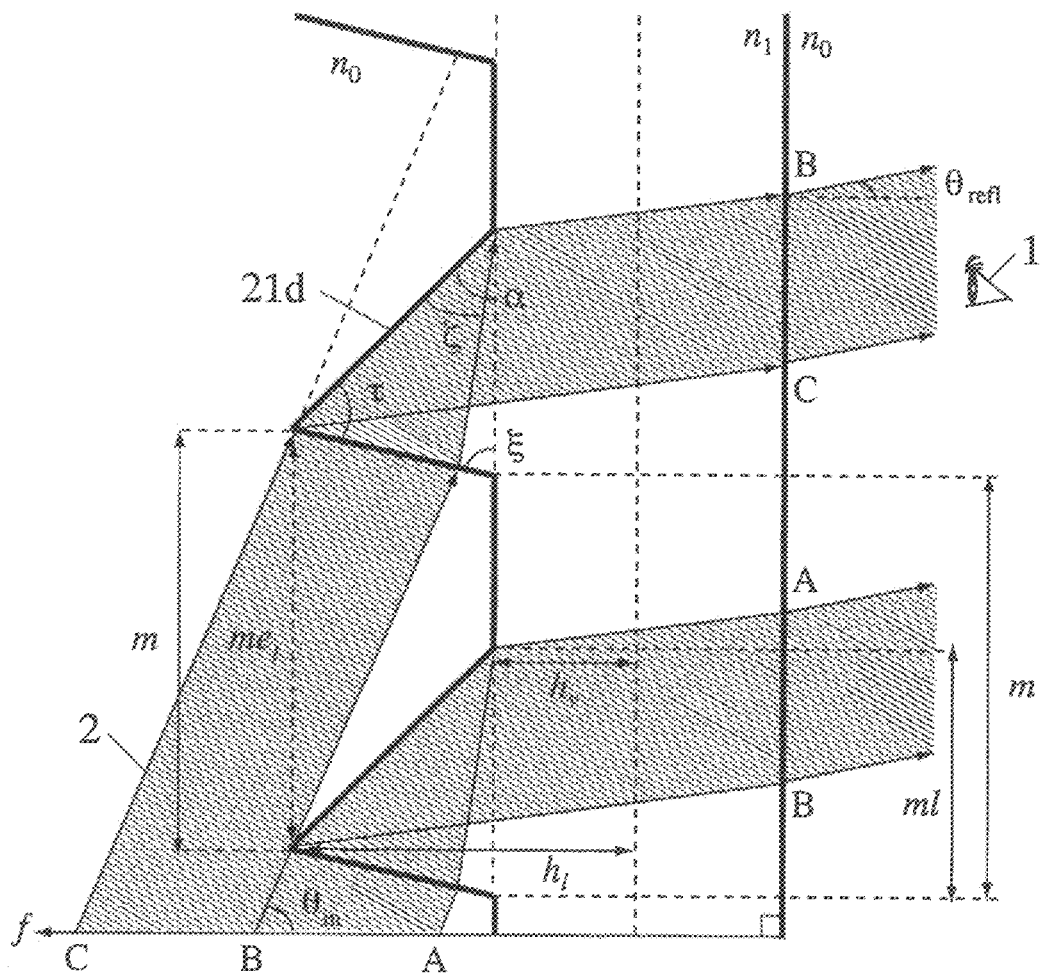
FIG. 4 is an enlarged diagram illustrating an incident-surface partial total-reflection type Fresnel lens used as a Fresnel optical element according to the first embodiment of the present invention.

FIG. 4 is an enlarged diagram illustrating the incident-surface partial total-reflection type Fresnel lens 21d used as the Fresnel optical element according to the first embodiment of the present invention. A hatched area illustrated in FIG. 4 exhibits an optical path of a signal light beam. The incident-surface partial total-reflection type Fresnel lens 21d applied as the best lens is formed on the rear side (light source side) as seen from the viewer 1.

The incident-surface partial total-reflection type Fresnel lens 21d has the following two features.
(1) Each of the plurality of Fresnel prisms which are arranged in the saw-tooth pattern has a refraction surface for refracting a light ray emitted from the emitter and a reflection surface for reflecting the light ray refracted at the refraction surface.
(2) Non-incident surfaces which are not directly irradiated with the light ray from the emitter blocked by the previous Fresnel prisms are formed substantially parallel to a base surface on which the plurality of Fresnel prisms are arranged.

In the case of the incident-surface partial total-reflection type Fresnel lens 21d having the features as described above, the light beam is refracted at the incident surface (refraction surface) and totally reflected on the opposed oblique surface (reflection surface), and then exits to the viewer 1 side. At this time, a continuous light beam A-B-C is divided into a light beam B-A and a light beam C-B. In other words, when the Fresnel prism period "m" is set to a small value, the wave front may be finely divided by the small apertures of the Fresnel lens.

Figure 5:
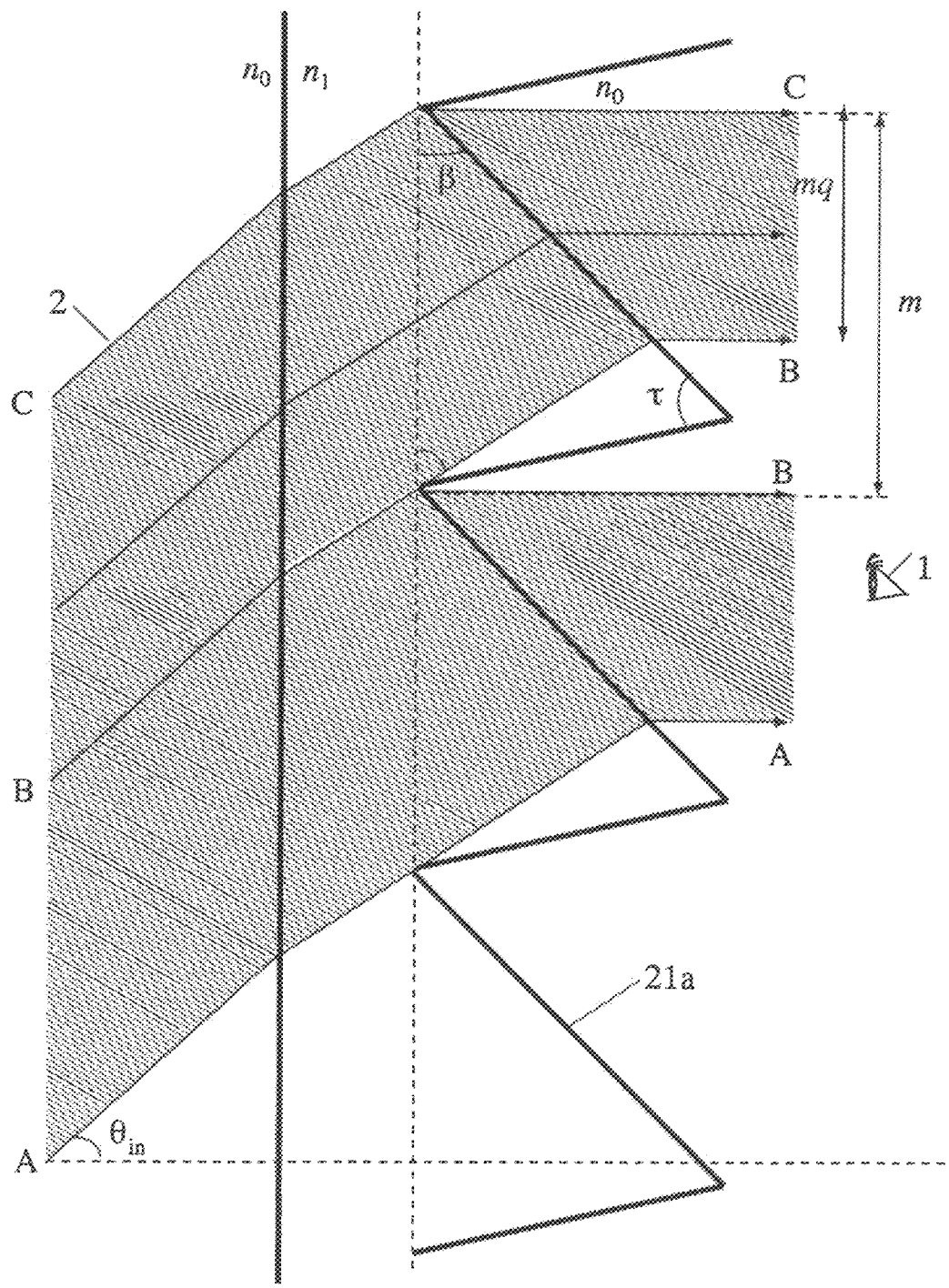
FIG. 5 is an enlarged diagram illustrating a conventional exit surface refraction type Fresnel lens used as the Fresnel optical element according to the first embodiment of the present invention.
Figure 6:
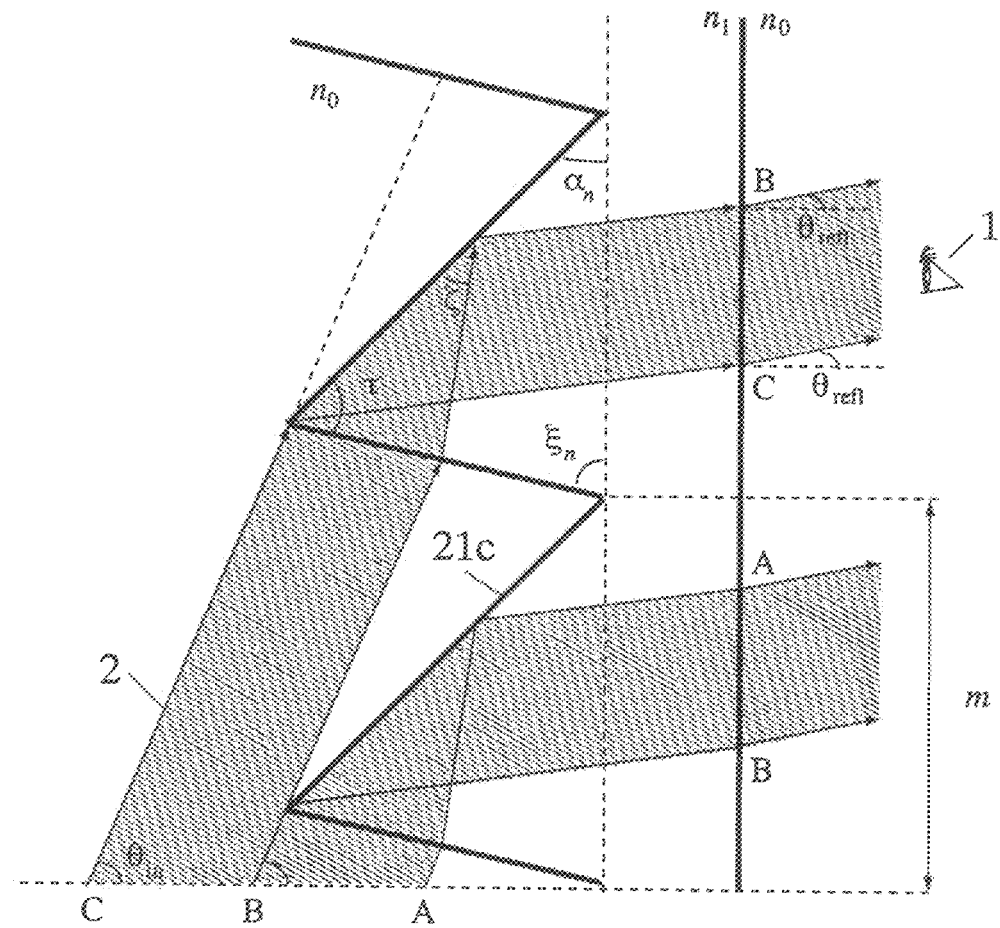
FIG. 6 is an enlarged diagram illustrating an incident-surface side total-reflection type Fresnel lens used as the Fresnel optical element according to the first embodiment of the present invention.

FIG. 5 is an enlarged diagram illustrating the conventional exit surface refraction type Fresnel lens 21a used as the Fresnel optical element according to the first embodiment of the present invention. FIG. 6 is an enlarged diagram illustrating the incident-surface side total-reflection type Fresnel lens 21c used as the Fresnel optical element according to the first embodiment of the present invention. A hatched area illustrated in each of FIGS. 5 and 6 exhibits an optical path of a signal light beam.

In the case of the conventional exit surface refraction type Fresnel lens 21a illustrated in FIG. 5, the Fresnel lens is formed on the viewer 1 side (see FIG. 2). When a continuous light beam A-B-C enters the screen from the side opposed to the viewer 1, the light beam is bent toward the viewer by the exit surface refraction type Fresnel lens 21a and exits therefrom. At this time, the continuous light beam A-B-C is divided into a light beam A-B and a light beam B-C.

When the incident-surface side total-reflection type Fresnel lens 21c illustrated in FIG. 6 is used, a continuous light beam A-B-C is divided into a light beam B-A and a light beam C-B as in the case where the incident-surface partial total-reflection type Fresnel lens 21d illustrated earlier in FIG. 4 is used.

In other words, in each of the case where the incident-surface partial total-reflection type Fresnel lens 21d illustrated in FIG. 4 is used and the case where the incident-surface side total-reflection type Fresnel lens 21c illustrated in FIG. 6 is used, upper and lower parts of the light beam are reversed in an inner portion of the incident-surface side Fresnel lens, and hence the phase of the wave front is discontinuously divided. As is apparent from FIGS. 4 and 6, the incident-surface side total-reflection type Fresnel lens 21c and the incident-surface partial total-reflection type Fresnel lens 21d have the equivalent function in reducing the coherence in the case where the Fresnel lens is used. However, the incident-surface partial total-reflection type Fresnel lens 21d is more excellent in view of manufacturing and stray light, and hence the incident-surface partial total-reflection type Fresnel lens 21d is employed as the best lens.

Therefore, when the incident-surface side total-reflection type Fresnel lens 21c or the incident-surface partial total-reflection type Fresnel lens 21d is employed, the upper and lower parts of the light beam are reversed in the inner portion of the Fresnel lens, and hence the phase of the wave front may be discontinuously divided. As a result, the coherence may be reduced.

Next, a function of the first auxiliary lens 24 is described with reference back to FIG. 1. The incident-surface partial total-reflection type Fresnel lens 21d is employed. Therefore, the upper and lower parts of the wave front which has been finely divided by the small apertures are further reversed in the inner portion of the Fresnel lens, and hence the phase of the wave front may be divided. The first auxiliary lens 24 is provided on the exit surface of the Fresnel screen 20, and hence a wave front of light obtained by wave front division by the incident-surface partial total-reflection type Fresnel lens 21d may be further finely divided by the first auxiliary lens 24.

Thus, the wave front of the light entering the birefringent layer 90 through the second auxiliary lens 44 and the trapezoidal lens 41 is more finely divided. That is, the birefringent layer 90 may have a stronger coherence reduction effect in combination with the Fresnel lens screen 20.

As described above, according to the transmission type screen of the first embodiment, the Fresnel lens screen includes the Fresnel optical element and the first light diffusion means, and the image display element includes the lens element, the birefringent layer, and the second light diffusion means. The birefringent layer is provided between the lens element and the second light diffusion means to mix the image light beams obtained by spatial division by the lens element. With such structure, a transmission type screen having an excellent effect that an image may be displayed at a high color temperature and a high resolution while image degradation caused by speckles is reduced may be provided.

The auxiliary lenses for supporting the light distribution control of the lens element are provided on the respective opposed surfaces of the Fresnel lens screen and the image display element, and hence the wave front may be spatially and finely divided before the lens element. Therefore, the effect described above may be further enhanced.

According to the transmission type screen of the first embodiment, the Fresnel optical element has the following two features.

(1) Each of the plurality of Fresnel prisms which are arranged in the saw-tooth pattern has a refraction surface for refracting a light ray emitted from the emitter and a reflection surface for reflecting the light ray refracted at the refraction surface.

(2) Non-incident surfaces which are not directly irradiated with the light ray from the emitter blocked by the previous Fresnel prisms are formed substantially parallel to a base surface on which the plurality of Fresnel prisms are arranged.

As a result, the upper and lower parts of the wave front are reversed in the Fresnel prisms, and hence the phase of the wave front may be discontinuously divided. When the birefringent layer is combined, the effect described above may be further enhanced.

The projection display apparatus according to the first embodiment includes any one of the transmission type screens and the emitter for emitting the image light to the corresponding transmission type screen. Therefore, a projection display apparatus capable of displaying an image at a high color temperature and a high resolution while image degradation caused by speckles is reduced may be provided.

Second Embodiment

In the second embodiment, a case where the lens element 40a different in structure from the lens element 40 according to the first embodiment is used is described.

Figure 7:
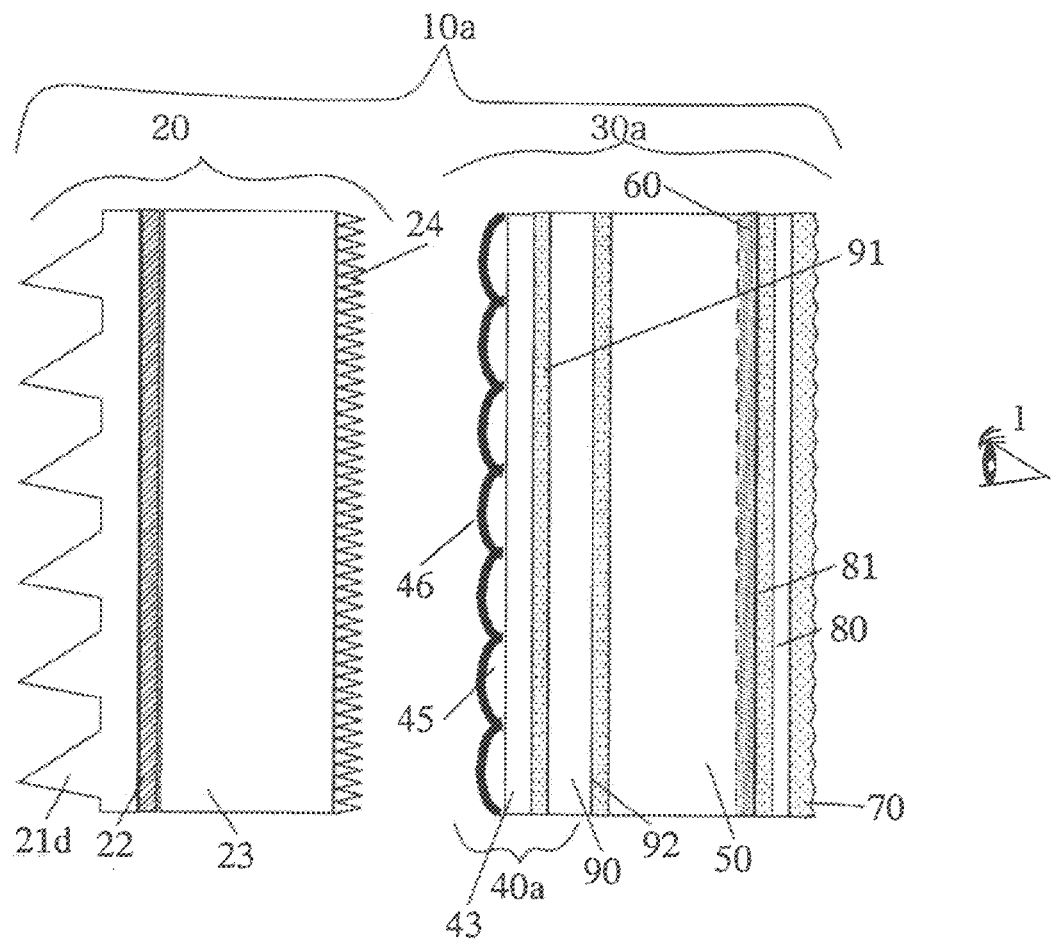
FIG. 7 is a structural view illustrating a transmission type screen according to a second embodiment of the present invention.

FIG. 7 is a structural view illustrating a transmission type screen according to the second embodiment of the present invention. As illustrated in FIG. 7, a transmission type screen 10a according to the second embodiment has the same fundamental structure as the transmission type screen 10 according to the first embodiment as illustrated earlier in FIG. 1. Hereinafter, the lens element 40a corresponding to the different point is mainly described.

The lens element 40 described earlier in the first embodiment includes the trapezoidal lens 41, the light absorption portion 42, the fourth base 43, and the second auxiliary lens 44. In contrast, as illustrated in FIG. 7, the lens element 40a according to the second embodiment includes an elliptical lens 45, a light absorption portion 46, and the fourth base 43.

The light absorption portion 46 receiving light through the elliptical lens 45 uses a refractive index difference with air (Δn is up to approximately 0.5). Therefore, the amount of absorption of image light from the Fresnel lens screen 20 is small (optical path length of light passing through light absorption portion 46 is short). The amount of absorption of ambient light is large (optical path length of light passing through light absorption portion 46 is long). Such a structure is effective in improving yields because the lens element 40a is simplified.

As described above, according to the transmission type screen of the second embodiment, the lens element including the elliptical lens and the light absorption portion is used, and hence the structure is simplified to improve the yields and the same effect as in the first embodiment described earlier may be obtained.

What is claimed is:

1. A transmission type screen used for a rear projection type display apparatus for projecting image light from a rear surface thereof as seen from a viewer, comprising:
   a Fresnel lens screen for bending the image light from an emitter toward the viewer; and
   an image display element for imaging the image light from the Fresnel lens screen and expanding the image light at a dispersion angle,
   wherein the Fresnel lens screen includes:
      a Fresnel optical element including a prism formed on an incident surface side as seen from the emitter; and
      first light diffusion means for diffusing the image light passing through the Fresnel optical element, and
   wherein the image display element includes:
      a lens element for spatially dividing the image light from the Fresnel lens screen and changing a direction of the image light;
      a birefringent layer provided at a subsequent stage of the lens element, for mixing image light obtained by spatial division by the lens element; and
      second light diffusion means provided at a subsequent stage of the birefringent layer, for diffusing the image light passing through the birefringent layer.

2. A transmission type screen according to claim 1, further comprising:
   a first auxiliary lens provided on a surface of the Fresnel lens screen which is opposed to the image display element, for spatially dividing a wave front of the image light diffused by the first light diffusion means; and
   a second auxiliary lens provided on a surface of the image display element which is opposed to the Fresnel lens screen, for spatially dividing the wave front of the image light which is divided in wave front by the first auxiliary lens, to be orthogonal to a wave front division direction of the first auxiliary lens.

3. A transmission type screen according to claim 1 or 2, wherein the birefringent layer comprises a resin sheet having different birefringent optical axis directions.

4. A transmission type screen according to claim 1 or 2, wherein the birefringent layer comprises a wavelength plate having a single birefringent optical axis direction.

5. A projection display apparatus, comprising:
   the transmission type screen according to claim 1 or 2; and
   an emitter for emitting image light to the transmission type screen.

6. An image display method for a transmission type screen used for a rear projection type display apparatus for projecting image light from a rear surface thereof as seen from a viewer, the transmission type screen comprising:
- a Fresnel lens screen for bending the image light from an emitter toward the viewer; and
- an image display element for imaging the image light from the Fresnel lens screen and expanding the image light at a dispersion angle, the image display method comprising:

a first diffusion step of diffusing, by the Fresnel lens screen, the image light passing through a Fresnel optical element;

a spatially dividing step of spatially dividing, by the image display element, the image light from the Fresnel lens screen and changing a direction of the image light;

a birefringent step of mixing image light obtained by spatial division in the spatially dividing step through birefringence; and a second diffusion step of diffusing the image light after the birefringent step.

* * * * *